(12) United States Patent
Inagaki et al.

(10) Patent No.: US 10,752,093 B2
(45) Date of Patent: Aug. 25, 2020

(54) REGISTER AND VEHICLE (71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Yuya Inagaki, Kariya (JP); Toshinao Wada, Miyoshi (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 109 days.

(21) Appl. No.: 15/428,237

(22) Filed: Feb. 9, 2017

(65) Prior Publication Data
US 2017/0225545 A1    Aug. 10, 2017

(30) Foreign Application Priority Data
Feb. 10, 2016    (JP) .................................. 2016-023868

(51) Int. Cl.
*B60H 1/34*    (2006.01)
*B62D 1/04*    (2006.01)

(52) U.S. Cl.
CPC ............. *B60H 1/3421* (2013.01); *B62D 1/04* (2013.01); *B60H 2001/3471* (2013.01)

(58) Field of Classification Search
CPC ...... B60H 1/34; B60H 1/3407; B60H 1/3414; B60H 1/3421; B60H 2001/3471; B62D 1/04
(Continued)

(56) References Cited

U.S. PATENT DOCUMENTS 5,356,336 A * 10/1994 Stouffer ................... B60H 1/34
                                                     454/155
7,201,650 B2 * 4/2007 Demerath ............ B60H 1/3414
                                                     454/154
(Continued)

FOREIGN PATENT DOCUMENTS

JP     02124434 U    10/1990
JP     5-332610 A    12/1993
(Continued)

*Primary Examiner* — Edelmira Bosques
*Assistant Examiner* — Dana K Tighe
(74) *Attorney, Agent, or Firm* — Sughrue Mion, PLLC (57) ABSTRACT

A register includes: a cylindrical member including a first cylindrical portion and a second cylindrical portion provided at a downstream side relative to the first portion, the first portion having a first opening area, the second portion having a second opening area larger than the first area; and a plurality of fins each having a pivotable range and disposed inside the cylindrical member. A projection image is hypothetically formed by projecting, to the downstream side, an opening portion defining the first area in the first portion. A dummy opening is defined to represent a region located inside the second portion and not overlapping with the image. A specific fin is defined to represent at least one of the plurality of fins. The specific fin is provided to be always located in the dummy opening when being pivoted, the specific fin being pivotable together with the fins collectively.

6 Claims, 8 Drawing Sheets (58) Field of Classification Search
USPC .......................................................... 454/155
See application file for complete search history.

(56) References Cited

U.S. PATENT DOCUMENTS

| | | | | |
|---|---|---|---|---|
| 2004/0219874 | A1* | 11/2004 | Karadia | B60H 1/3421 454/155 |
| 2005/0042982 | A1* | 2/2005 | Okada | B60H 1/3421 454/284 |
| 2005/0239391 | A1 | 10/2005 | Shibata | |
| 2005/0245189 | A1* | 11/2005 | Terai | B60H 1/3414 454/155 |
| 2010/0130115 | A1* | 5/2010 | Miki | B60H 1/34 454/155 |
| 2010/0263401 | A1* | 10/2010 | Sakakibara | B60H 1/3421 62/408 |
| 2011/0154850 | A1* | 6/2011 | Kai | B60H 1/3421 62/426 |
| 2012/0238197 | A1 | 9/2012 | Katagiri et al. | |
| 2014/0120826 | A1* | 5/2014 | Takai | F24F 13/075 454/318 |
| 2014/0302769 | A1* | 10/2014 | Sawada | B60H 1/3421 454/315 |

FOREIGN PATENT DOCUMENTS

| JP | 2005306224 A | 11/2005 |
|---|---|---|
| JP | 2012188086 A | 10/2012 |

* cited by examiner

REGISTER AND VEHICLE

This nonprovisional application is based on Japanese Patent Application No. 2016-023868 filed on Feb. 10, 2016 with the Japan Patent Office, the entire contents of which are hereby incorporated by reference.

BACKGROUND OF THE INVENTION

Field of the Invention

The present invention relates to a register having a plurality of pivotable fins and a vehicle including such a register.

Description of the Background Art

As disclosed in Japanese Patent Laying-Open No. 05-332610, a register having a plurality of pivotable fins has been known. When determining a configuration of the register, it is necessary to consider not only an external shape of the register itself but also a layout balance (arrangement relation) between the register and an onboard device (such as an audio device, a navigation device, a steering wheel, or the like) disposed around the register.

SUMMARY OF THE INVENTION

When determining the configuration of the register, it is also necessary to determine an opening shape (opening area) of the register and configurations of the plurality of fins disposed in the register. In recent years, in addition to an opening via which air is actually sent, a dummy opening may be provided adjacent to this opening. The dummy opening hardly contributes to actually sending air, and air is hardly blown from the dummy opening. In order to improve design, it is important that a configuration (operation) of a fin disposed in the dummy opening provides little sense of discomfort.

The present invention has an object to provide a register having a plurality of fins capable of operating with little sense of discomfort, as well as a vehicle including such a register.

A register according to the present invention includes: a cylindrical member including a first cylindrical portion and a second cylindrical portion provided at a downstream side relative to the first cylindrical portion, the first cylindrical portion having a first opening area, the second cylindrical portion having a second opening area larger than the first opening area; and a plurality of fins each having a predetermined pivotable range and disposed inside the cylindrical member, when a projection image is hypothetically formed by projecting, to the downstream side, an opening portion defining the first opening area in the first cylindrical portion, a dummy opening is defined to represent a region located inside the second cylindrical portion and not overlapping with the projection image, and a specific fin is defined to represent at least one of the plurality of fins, the specific fin being provided to be always located in the dummy opening when being pivoted in the pivotable range, the specific fin being pivotable together with the other fins of the plurality of fins collectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Related Art

Figure 1:
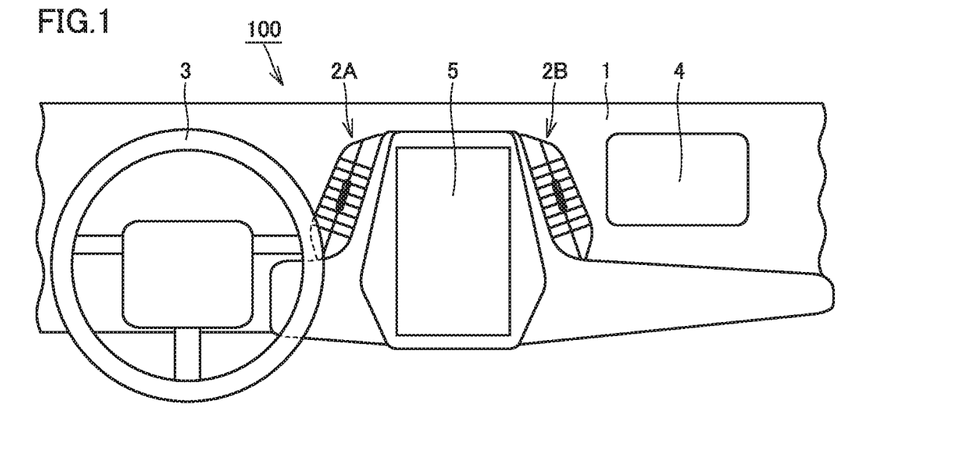
FIG. 1 shows a register provided in a vehicle compartment of a vehicle in a related art when viewed from a front side.

Before describing an embodiment, the following describes a related art in connection with the embodiment. In the description of the related art, the same component and corresponding component are given the same reference characters and may not be described repeatedly. FIG. 1 shows a register 2A provided in a vehicle compartment of a vehicle 100 in the related art when viewed from a front side.

With reference to FIG. 1, at a front portion in the vehicle compartment, the vehicle 100 includes an instrument panel 1, registers 2A, 2B, a steering wheel 3, an air bag unit 4, and an indicator 5. The register 2A is located at the steering wheel 3 side relative to the indicator 5, and has a lengthwise shape extending obliquely leftward and downward. The register 2B is located at the air bag unit 4 side relative to the indicator 5, and has a lengthwise shape extending obliquely rightward and downward. The registers 2A, 2B have shapes bilaterally symmetrical to each other with respect to the center axis of the indicator 5.

Figure 2:
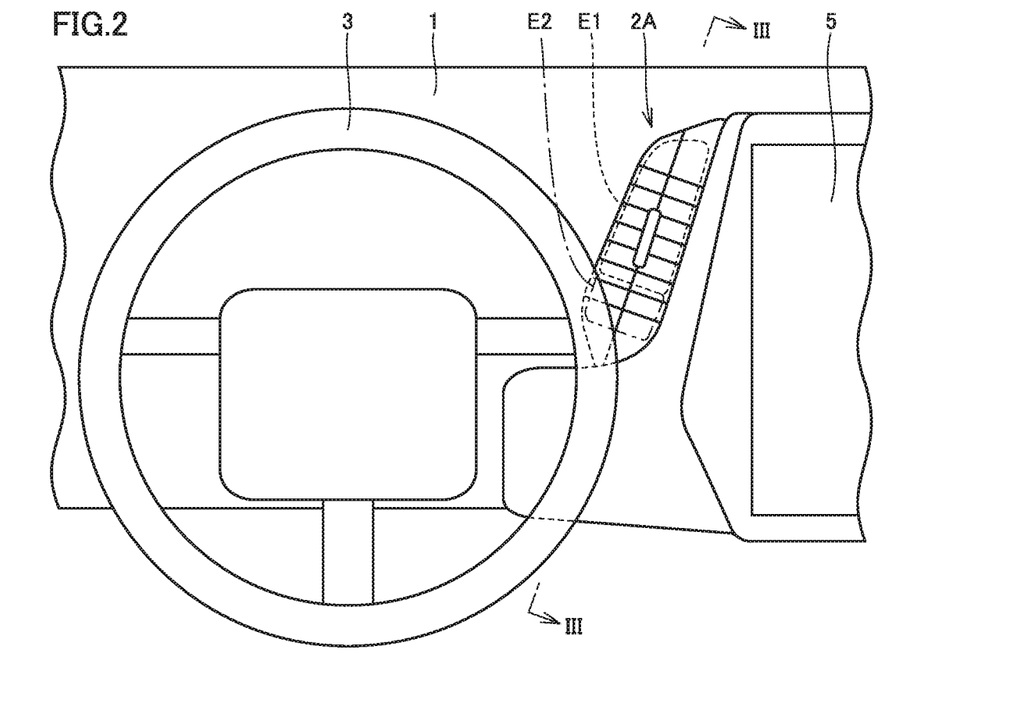
FIG. 2 is an enlarged view showing the register 2A in FIG. 1.
Figure 3:
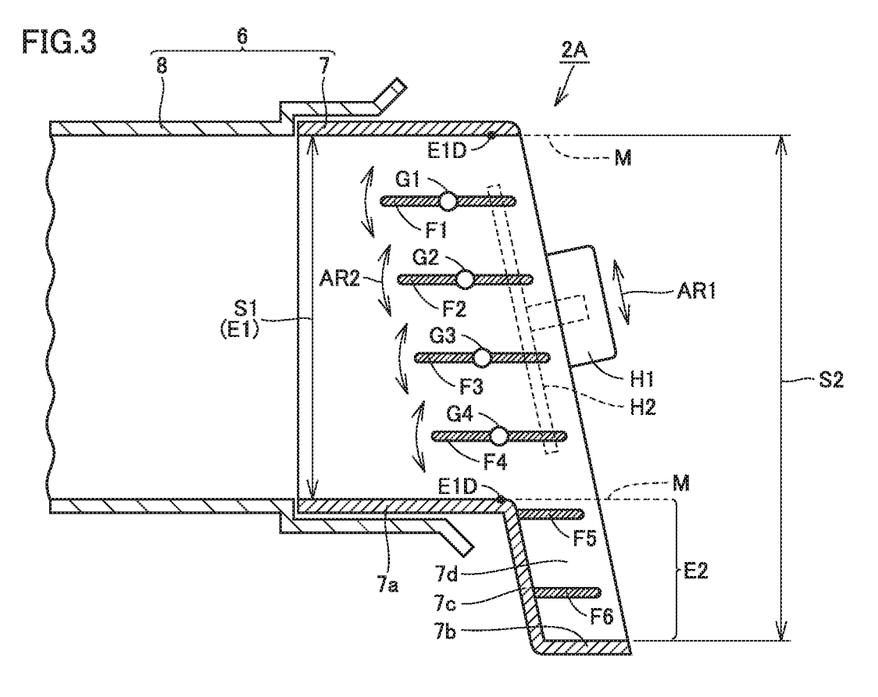
FIG. 3 is a cross sectional view taken along an III-III line in FIG. 2.

FIG. 2 is an enlarged view showing the register 2A in FIG. 1. FIG. 3 is a cross sectional view taken along an line III-III in FIG. 2. With reference to FIG. 2 and FIG. 3 (mainly FIG. 3), the register 2A includes a cylindrical member 6 and a plurality of fins F1 to F6. The cylindrical member 6 has a barrel 7 and a retainer 8. The barrel 7 of the cylindrical member 6 includes a first cylindrical portion 7a, a second cylindrical portion 7b, and a standing wall portion 7c.

The first cylindrical portion 7a of the barrel 7 is disposed inside a downstream portion of the retainer 8, and has a first opening area S1. The first cylindrical portion 7a has an opening portion E1, which defines the first opening area S1 and via which air is actually sent. When sending air, most of the air passes through this opening portion E1, and the air having passed through the opening portion E1 then flows to a downstream side (to the vehicle compartment).

The second cylindrical portion 7b of the barrel 7 is provided at the downstream side relative to the first cylindrical portion 7a, and has a second opening area S2 larger than the first opening area S1. The second cylindrical portion 7b has an opening portion that defines the second opening area S2 and that includes a dummy opening E2. The dummy opening E2 is a region defined as follows.

It is assumed that a projection image M is hypothetically formed by projecting, to the downstream side, the opening portion E1 defining the first opening area S1 in the first cylindrical portion 7a. A projection direction is in parallel with an axial direction of the first cylindrical portion 7a. Assuming that no fins F1 to F6 are provided in the register 2A, this projection direction is substantially in parallel with a direction of flow of the air flowing in the cylindrical member 6. When the axial direction of the first cylindrical portion 7a is in parallel with the forward/rearward direction of the vehicle 100, this projection direction is in parallel with the forward/rearward direction of the vehicle 100. The dummy opening E2 is a region that is located inside the second cylindrical portion 7b and that does not overlap with the projection image M obtained by the above-described projection. Air from the upstream is hardly supplied to a recess portion 7d forming the dummy opening E2 in the second cylindrical portion 7b, and therefore hardly contributes to actually sending air. That is, the air is hardly blown from the dummy opening E2 into the vehicle compartment.

The standing wall portion 7c of the barrel 7 is located behind the recess portion 7d forming the dummy opening E2 in the second cylindrical portion 7b of the barrel 7. The standing wall portion 7c is formed to extend obliquely downward from the most downstream portion E1D of the opening portion E1 defining the first opening area S1 in the barrel 7 (first cylindrical portion 7a).

(Fins F1 to F6)

Each of the plurality of fins F1 to F6 has a predetermined pivotable range, and is disposed inside the cylindrical member 6. The fins F1, F2, F3, F4 of the plurality of fins F1 to F6 are disposed at locations at which they overlap with the above-described projection image M. The fins F1, F2, F3, F4 are provided to always overlap with the above-described projection image M when being pivoted in the pivotable range, and can efficiently change a direction of air from the upstream.

The fins F1, F2, F3, F4 are coupled to an operation unit H1 via a link member H2. The fins F1, F2, F3, F4 are pivotably supported by pivoting shafts G1, G2, G3, G4. When the operation unit H1 is moved in an upward/downward direction (direction of arrow AR1), the fins F1, F2, F3, F4 can be pivoted in directions indicated by arrows AR2 (in other words, the directions of the fins F1, F2, F3, F4 can be changed).

The fins F5, F6 of the plurality of fins F1 to F6 are disposed at respective locations at which they do not overlap with the above-described projection image M. The fins F5, F6 have respective ends fixed to the standing wall portion 7c, and therefore the fins F5, F6 are not moved even when the operation unit H1 is moved in the upward/downward direction (the direction of arrow AR1).

(Function and Effect)

As described above, the registers 2A, 2B (FIG. 1) have the shapes bilaterally symmetrical to each other with respect to the center axis of the indicator 5. Each of the registers 2A, 2B is provided with the dummy opening E2 as show in FIG. 2. The fixed type fins F5, F6 are provided in the dummy opening E2 provided in each of the registers 2A, 2B.

When the steering wheel 3 is projected to the forward side in the vehicle forward/rearward direction, the projection image of the steering wheel 3 is located to overlap with the dummy opening E2 of the register 2A and not to overlap with the opening portion E1 defining the first opening area S1 in the first cylindrical portion 7a. Accordingly, air blown from the register 2A (opening portion E1) is hardly blocked by the steering wheel 3, and therefore can flow into the vehicle compartment.

Since the registers 2A, 2B have the shapes bilaterally symmetrical to each other with respect to the center axis of the indicator 5, the same effect is obtained both in the case where the registers 2A, 2B are mounted on a vehicle with the steering wheel at the right side and in the case where the registers 2A, 2B are mounted on a vehicle with the steering wheel at the left side. Furthermore, not only in the case of the vehicle 100 with the steering wheel at the left side as shown in FIG. 1 but also in the case of a vehicle with the steering wheel at the right side, the registers 2A, 2B can be applied to the same locations without modifying the respective configurations.

When projecting the steering wheel 3 to the forward side in the vehicle forward/rearward direction in the case of the vehicle with the steering wheel at the right side, the projection image of the steering wheel 3 is located to overlap with the dummy opening E2 of the register 2B and not to overlap with the opening portion E1 defining the first opening area S1 in the first cylindrical portion 7a. Air blown from the register 2B is hardly blocked by the steering wheel 3, and therefore can flow into the vehicle compartment.

Both in the case of the vehicle with the steering wheel at the left side and the vehicle with the steering wheel at the right side, the registers 2A, 2B and the indicator 5 can be applied to the same locations without modifying the respective configurations. When the registers 2A, 2B are employed, the registers 2A, 2B and devices therearound can be used commonly for both the vehicle with the steering wheel at the left side and the vehicle with the steering wheel at the right side, thus improving versatility of the various components.

Figure 4:
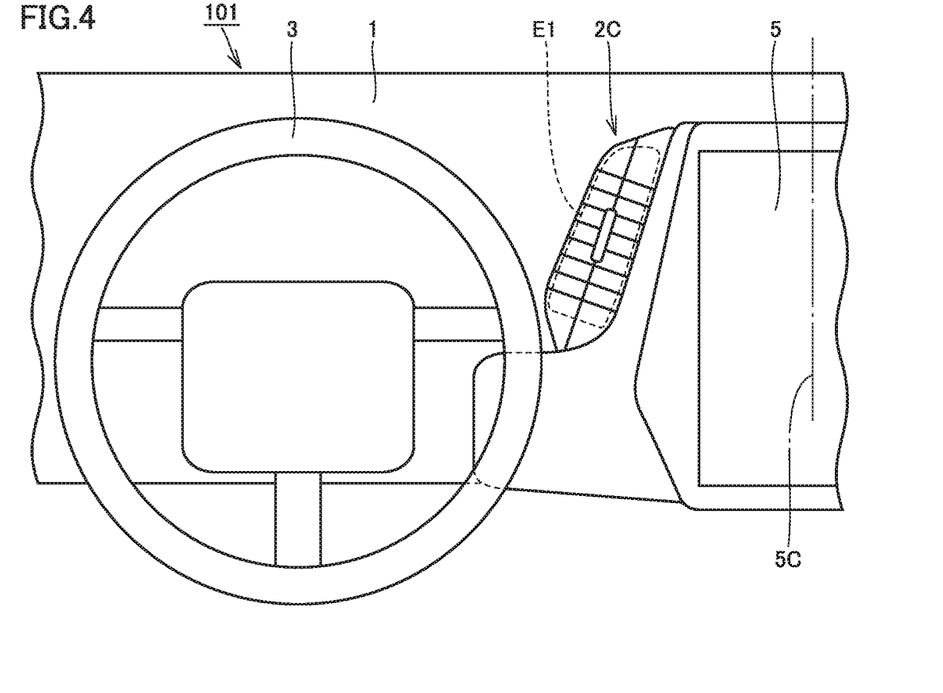
FIG. 4 shows a register provided in a vehicle compartment of a vehicle in another related art when viewed from the front side.

FIG. 4 shows a register 2C provided in a vehicle compartment of a vehicle 101 in another related art when viewed from the front side. The register 2C has the same external shape (size) as the register 2A, but the register 2C has only the opening portion E1 via which air is sent, and has no dummy opening E2. Since the register 2C does not have the dummy opening E2, a larger opening area can be secured in the register 2C than that in the register 2A. However, if the register 2C having such a configuration is provided at a location with the same height as that of the register 2A, the entire register 2C needs to be provided closer to the indicator 5 (passenger seat side) than that in the case shown in FIG. 1 in order to avoid the register 2C from overlapping with the steering wheel 3.

When the register 2C having only the opening portion E1 is applied to the driver's seat side, the register 2C needs to be disposed closer to the passenger seat side in order to avoid the register 2C from overlapping with the steering wheel 3, with the result that the center axis 5C of the indicator 5 needs to be shifted from the center location in the vehicle width direction toward the passenger seat side. The registers 2A, 2B in the foregoing related art can be applied to the same locations both in the case of the vehicle with the steering wheel at the left side and in the case of the vehicle with the steering wheel at the right side without modifying their configurations, thus attaining versatility of the various components. However, when the configuration of the register 2C is employed, the register 2C and the indicator 5 are disposed at locations shifted toward the passenger seat side, with the result that the configurations of the instrument panel 1 and devices disposed in the instrument panel 1 need to be different for the vehicle with the steering wheel at the left side and the vehicle with the steering wheel at the right side.

Therefore, in order to set the center axis 5C of the indicator 5 at the center location in the vehicle width direction and to improve versatility of the various components, it can be said that as with the register 2A, the register is preferably provided near the steering wheel 3 and the dummy opening E2 is preferably formed in the register. Even when the indicator 5 is increased in its size, the center axis 5C of the indicator 5 can be set at the center location in the vehicle width direction and the versatility of the various components can be improved by providing the register with a dummy opening E2 having an appropriate size as in the registers 2A, 2B in consideration of the size of a portion at which the register and the steering wheel 3 overlap with each other.

However, in the register 2A in the above-described related art, the ends of the fins F5, F6 are fixed to the standing wall portion 7c. The fins F5, F6 are not moved even when moving the operation unit H1 in the upward/downward direction (direction of arrow AR1). As described at the beginning, in order to improve design, it is important that the configurations (operations) of the fins F5, F6 disposed in the dummy opening E2 provide little sense of discomfort.

EMBODIMENT

Figure 5:
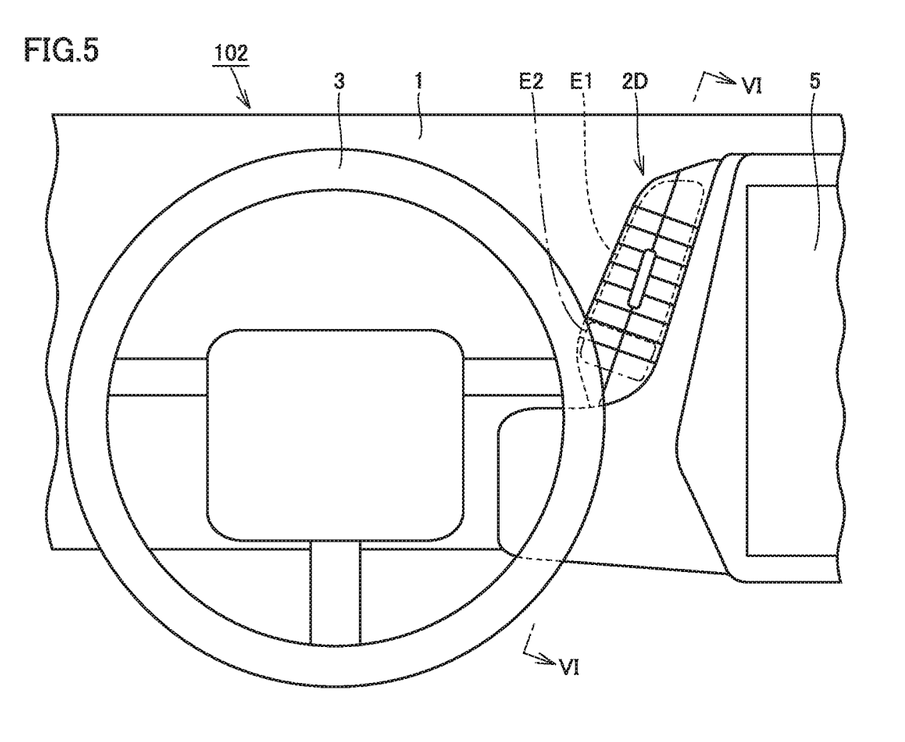
FIG. 5 shows a register provided in a vehicle compartment of a vehicle in an embodiment when viewed from the front side.
Figure 6:
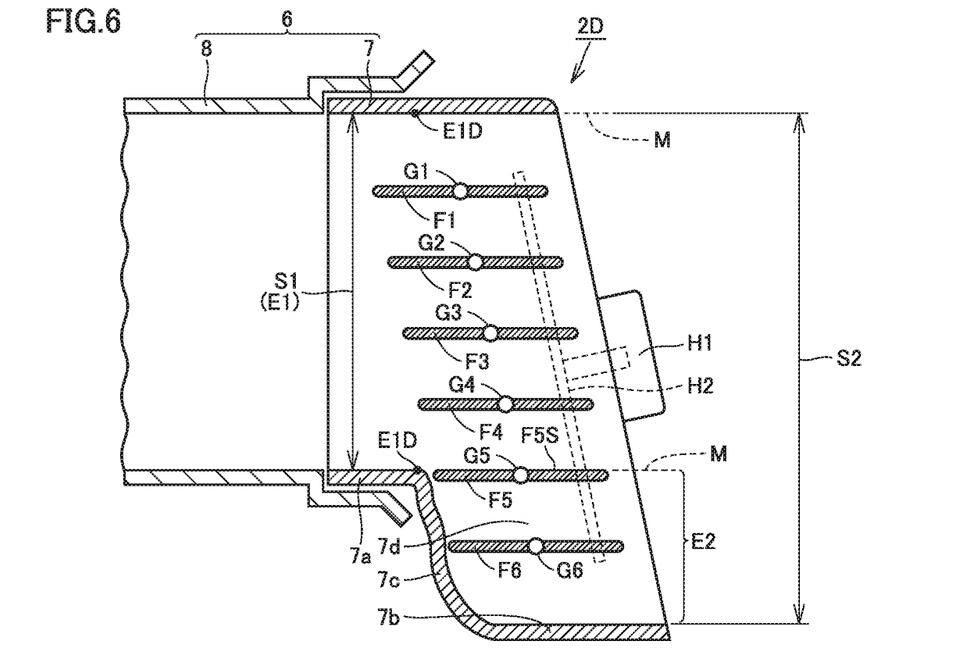
FIG. 6 is a cross sectional view taken along a VI-VI line in FIG. 5.

The following describes an embodiment with reference to figures. In the description of the embodiment, the same component and corresponding component are given the same reference characters and may not be described repeatedly. FIG. 5 shows a register 2D provided in a vehicle compartment of a vehicle 102 in the embodiment when viewed from the front side. FIG. 6 is a cross sectional view taken along a VI-VI line in FIG. 5.

With reference to FIG. 5 and FIG. 6, at a front portion in the vehicle compartment, the vehicle 102 includes an instrument panel 1, the register 2D, a steering wheel 3, and an indicator 5. The register 2D is located at the steering wheel 3 side relative to the indicator 5, and has a lengthwise shape extending obliquely leftward and downward.

As shown in FIG. 6, the register 2D includes a cylindrical member 6 and a plurality of fins F1 to F6. The cylindrical member 6 has a barrel 7 and a retainer 8. The barrel 7 of the cylindrical member 6 includes a first cylindrical portion 7a, a second cylindrical portion 7b, and a standing wall portion 7c.

The second cylindrical portion 7b of the barrel 7 is provided at the downstream side relative to the first cylindrical portion 7a, and has a second opening area S2 larger than the first opening area S1. The second cylindrical portion 7b has an opening portion that defines the second opening area S2 and that includes a dummy opening E2. The dummy opening E2 is a region defined as follows.

It is assumed that a projection image M is hypothetically formed by projecting, to the downstream side, the opening portion E1 defining the first opening area S1 in the first cylindrical portion 7a. A projection direction is in parallel with an axial direction of the first cylindrical portion 7a. Assuming that no fins F1 to F6 are provided in the register 2D, this projection direction is substantially in parallel with a direction of flow of the air flowing in the cylindrical member 6. When the axial direction of the first cylindrical portion 7a is in parallel with the forward/rearward direction of the vehicle, this projection direction is in parallel with the forward/rearward direction of the vehicle. The dummy opening E2 is a region that is located inside the second cylindrical portion 7b and that does not overlap with the projection image M obtained by the above-described projection. Air from the upstream is hardly supplied to a recess portion 7d forming the dummy opening E2 in the second cylindrical portions 7b, and therefore hardly contributes to actually sending air. That is, the air is hardly blown from the dummy opening E2 into the vehicle compartment. It should be noted that a longer length in the vehicle forward/rearward direction is secured for the recess portion 7d in the present embodiment than that for the recess portion 7d in the related art.

The standing wall portion 7c of the barrel 7 is located behind the recess portion 7d forming the dummy opening E2 in the second cylindrical portion 7b of the barrel 7. The standing wall portion 7c is formed to extend obliquely downward from the most downstream portion E1D of the opening portion E1 defining the first opening area S1 in the barrel 7 (first cylindrical portion 7a).

As shown in FIG. 5, in the present embodiment, when projecting the steering wheel 3 to the forward side in the vehicle forward/rearward direction, the projection image of the steering wheel 3 is located not to overlap with the opening portion E1 defining the first opening area S1 in the first cylindrical portion 7a. Air blown from the register 2D (opening portion E1) is hardly blocked by the steering wheel 3, and therefore can flow into the vehicle compartment.

(Fins F1 to F6)

Each of the plurality of fins F1 to F6 (fins F1, F2, F3, F4, F5, F6; the same applies to the description below) has a predetermined pivotable range, and is disposed inside the cylindrical member 6. The fins F1 to F6 are coupled to an operation unit H1 via a link member H2. The fins F1 to F6 are pivotably supported by pivotable shafts G1 to G6. When the operation unit H1 is moved in the upward/downward direction, the fins F1 to F6 can be pivoted collectively (in other words, the directions of the fins F1 to F6 can be changed).

The fins F1, F2, F3, F4 of the plurality of fins F1 to F6 are disposed at respective locations at which they overlap with the above-described projection image M. The fins F1, F2, F3, F4 are provided to always overlap with the above-described projection image M when being pivoted within the pivotable range, and can efficiently change a direction of air from the upstream. The fin F5 is provided at a location at which the fin F5 sometimes overlaps with and sometimes does not overlap with the projection image M when the fin F5 is pivoted in the pivotable range.

On the other hand, the fin F6 (specific fin) is disposed at a location at which the fin F6 does not overlap with the projection image M. The fin F6 is provided not to always overlap with the projection image M when being pivoted in the pivotable range and is provided to be always located in the dummy opening E2 (more specifically, inside the recess portion 7d forming the dummy opening E2 in the second cylindrical portions 7b).

The fin F5, which is disposed inwardly of the fin F6 (specific fin) by one fin, has a main surface F5S (FIG. 6) opposite to the fin F6. As a preferred embodiment, the main surface F5S of the fin F5 is disposed at a location at which the main surface F5S of the fin F5 can form a posture to be flush with the opening portion E1 defining the first opening area S1 in the first cylindrical portion 7a when being pivoted in the pivotable range. In the present embodiment, when the main surface F5S of the fin F5 is adjusted in its pivoting angle to orient in a direction parallel to the vehicle forward/rearward direction (when the fin F5 is set at a neutral state), the main surface F5S of the fin F5 become flush with the opening portion E1 defining the first opening area S1 in the first cylindrical portion 7a. In this state (the state shown in FIG. 6), the recess portion 7d is hardly or never supplied with air from the upstream. Occurrence of turbulence of air or the like is suppressed when the fin F5 is set at the neutral state, thereby smoothly sending air.

Figure 7:
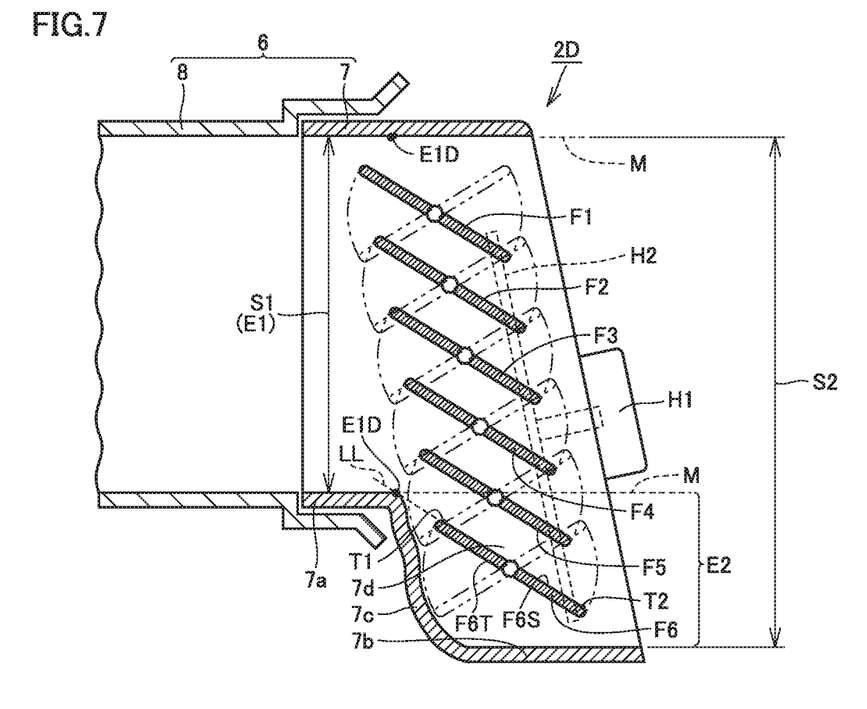
FIG. 7 is a cross sectional view showing that the register provided in the vehicle compartment of the vehicle in the embodiment forms a predetermined pivoting angle (a downstream end T2 of a fin F6 forms such a posture that the downstream end T2 orients most outward in a pivotable range).

With reference to FIG. 7, in the present embodiment, the fin F6 (specific fin) has a foreside main surface F6S and an underside main surface F6T. The foreside main surface F6S is a surface located closer to the fins F1 to F5 (the other fins) when viewed from the fin F6, whereas the underside main surface F6T is a surface located opposite to the fins F1 to F5 (the other fins) when viewed from the fin F6. The foreside main surface F6S has an upstream end T1 and a downstream end T2. As a preferred embodiment, when the downstream end T2 of the fin F6 forms such a posture that the downstream end T2 orients most outward in the pivotable range as shown in FIG. 7, a hypothetical straight line LL connecting the downstream end T2 and the upstream end T1 crosses a portion, which is the closest to the fin F6, within the most downstream portion E1D of the opening portion E1 defining the first opening area S1 in the first cylindrical portion 7a. According to this configuration, when the downstream end T2 of the fin F6 forms such a posture that the downstream end T2 orients most outward in the pivotable range, air flows between the fin F5 and the fin F6 but air from the upstream is hardly or never supplied to a space close to the underside main surface F6T of the fin F6. Accordingly, occurrence of turbulence of air or the like is suppressed while the fin can be moved, thereby smoothly sending air.

(Function and Effect)

As described above, in the present embodiment, the fin F6 is provided in the dummy opening E2 (more specifically, provided inside the recess portion 7d forming the dummy opening E2 in the second cylindrical portion 7b) so as to be always located in the dummy opening E2 when being pivoted in the pivotable range. When a user operates the operation unit H1, the fin F6 can be pivoted together with the other fins F1 to F5 of the plurality of fins collectively. Since the fins F1 to F6 are moved collectively, the user hardly feels a sense of discomfort when operating the operation unit H1. The dummy opening may be provided not only to improve design as described above but also to secure the bilateral symmetry for the sake of production efficiency. According to the configuration of the present embodiment, the user can feel as if the register 2D did not include such a dummy opening, thus providing the user with such an impression that the vehicle is a high-quality vehicle with a high-grade specification as compared with a case where the fin F6 is not movable.

(Modification)

Figure 8:
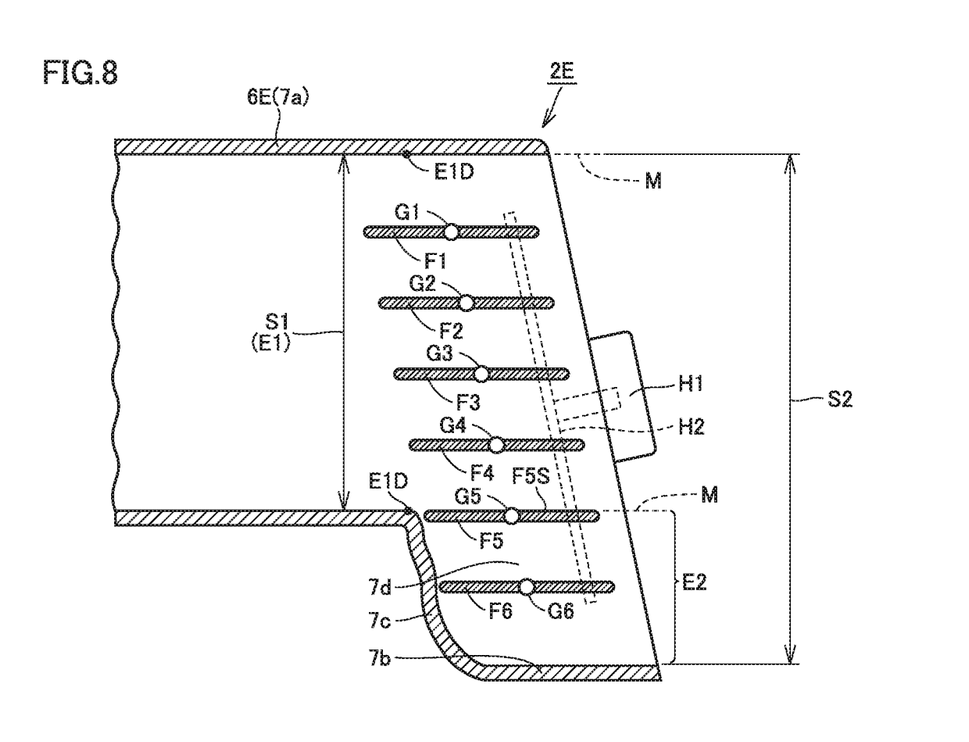
FIG. 8 is a cross sectional view showing a register provided in a vehicle compartment of a vehicle in a modification of the embodiment.

With reference to FIG. 8, the following describes a vehicle 103 and a register 2E in a modification of the embodiment. In the foregoing embodiment, the cylindrical member 6 is constituted of the following two members: the barrel 7 and the retainer 8. As shown in FIG. 8, a cylindrical member 6E included in the register 2E of the vehicle 103 does not have the divided configuration unlike that in the foregoing embodiment, and the first cylindrical portion 7a, the second cylindrical portion 7b, and the standing wall portion 7c are constituted of one member. The other points are the same between the modification and the embodiment. Also, according to the configuration of the modification, when a user operates the operation unit H1, the fin F6 can be pivoted together with the other fins F1 to F5 of the plurality of fins collectively. Since the fins F1 to F6 are moved collectively, the user hardly feels a sense of discomfort when operating the operation unit H1.

Moreover, in each of the foregoing embodiment and the modification, only one fin F6 is disposed in the dummy opening E2 (recess portion 7d); however, a plurality of fins may be disposed in the dummy opening E2 (recess portion 7d) as with the fin F6.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A register comprising:
   a cylindrical member including a first cylindrical portion and a second cylindrical portion, the second cylindrical portion being provided at a downstream side relative to the first cylindrical portion, the first cylindrical portion having a first opening area, the second cylindrical portion having a second opening area larger than the first opening area; and
   a plurality of fins each having a predetermined pivotable range and disposed inside the cylindrical member,
   a projection image being hypothetically formed by projecting, to the downstream side, an opening portion defining the first opening area in the first cylindrical portion,
   a dummy opening being defined to represent a region located inside the second cylindrical portion and not overlapping with the projection image,
   the plurality of fins including a first fin, a second fin and a third fin,
   the first fin being provided to always overlap with the projection image when being pivoted in the predetermined pivotable range,
   the second fin being provided at a location at which the second fin is configured to sometimes overlap and sometimes not overlap with the projection image when being pivoted in the predetermined pivotable range, and
   the third fin being provided to be always located in the dummy opening when being pivoted in the pivotable range, and the third fin being pivotable together with the first fin and the second fin collectively, wherein
   the third fin has a foreside main surface and an underside main surface,
   the foreside main surface is a surface located closer to the first fin and the second fin when viewed from the third fin,
   the underside main surface is a surface located opposite to the first fin and the second fin when viewed from the third fin,
   the foreside main surface has an upstream end and a downstream end, and
   when the downstream end of the foreside main surface of the third fin forms such a posture that the downstream end of the foreside main surface orients most outward in the pivotable range, a hypothetical straight line connecting the downstream end and the upstream end of the foreside main surface crosses a most downstream portion of the opening portion defining the first opening area in the first cylindrical portion.

2. The register according to claim 1, wherein the second fin is disposed inwardly of the third fin by one fin and is disposed at a location at which the second fin is capable of forming a posture to be flush with the opening portion defining the first opening area in the first cylindrical portion when being pivoted in the pivotable range.

3. A vehicle comprising:
a steering wheel; and
the register recited in claim 1,
when the steering wheel is projected to a forward side in a vehicle forward/rearward direction, a projection image of the steering wheel being located not to overlap with the opening portion defining the first opening area in the first cylindrical portion.

4. A register comprising:
a cylindrical member including a first cylindrical portion and a second cylindrical portion, the second cylindrical portion being provided at a downstream side relative to the first cylindrical portion, the first cylindrical portion having a first opening area, the second cylindrical portion having a second opening area larger than the first opening area;
a plurality of fins each having a predetermined pivotable range and disposed inside the cylindrical member,
a projection image being hypothetically formed by projecting, to the downstream side, an opening portion defining the first opening area in the first cylindrical portion,
a dummy opening defined to represent a region located inside the second cylindrical portion and not overlapping with the projection image,
the plurality of fins including a first fin, a second fin and a third fin,
the first fin being provided to always overlap with the projection image when being pivoted in the predetermined pivotable range,
the second fin being provided at a location at which the second fin is configured to sometimes overlap and sometimes not overlap with the projection image when being pivoted in the predetermined pivotable range,
the third fin being provided to be always located in the dummy opening when being pivoted in the pivotable range, and the third fin being pivotable together with the first fin and the second fin collectively; and
an operation unit coupled to the first fin, the second fin and the third fin via a link member, and wherein the first fin, the second fin and the third fin pivot collectively when the operation unit moves in an upward/downward direction, wherein
the third fin has a foreside main surface and an underside main surface,
the foreside main surface is a surface located closer to the first fin and the second fin when viewed from the third fin,
the underside main surface is a surface located opposite to the first fin and the second fin when viewed from the third fin,
the foreside main surface has an upstream end and a downstream end, and
when the downstream end of the third fin forms such a posture that the downstream end orients most outward in the pivotable range, a hypothetical straight line connecting the downstream end and the upstream end crosses a most downstream portion of the opening portion defining the first opening area in the first cylindrical portion.

5. The register according to claim 4, wherein the second fin is disposed inwardly of the third fin by one fin and is disposed at a location at which the second fin is capable of forming a posture to be flush with the opening portion defining the first opening area in the first cylindrical portion when being pivoted in the pivotable range.

6. A vehicle comprising:
a steering wheel; and
the register recited in claim 4,
when the steering wheel is projected to a forward side in a vehicle forward/rearward direction, a projection image of the steering wheel being located not to overlap with the opening portion defining the first opening area in the first cylindrical portion.

* * * * *